May 8, 1934.    P. M. OTERO    1,957,610
MILK BOTTLE LOCK
Original Filed Aug. 5, 1932    2 Sheets-Sheet 1

Inventor
Pedro M. Otero
By Clarence A. O'Brien
Attorney

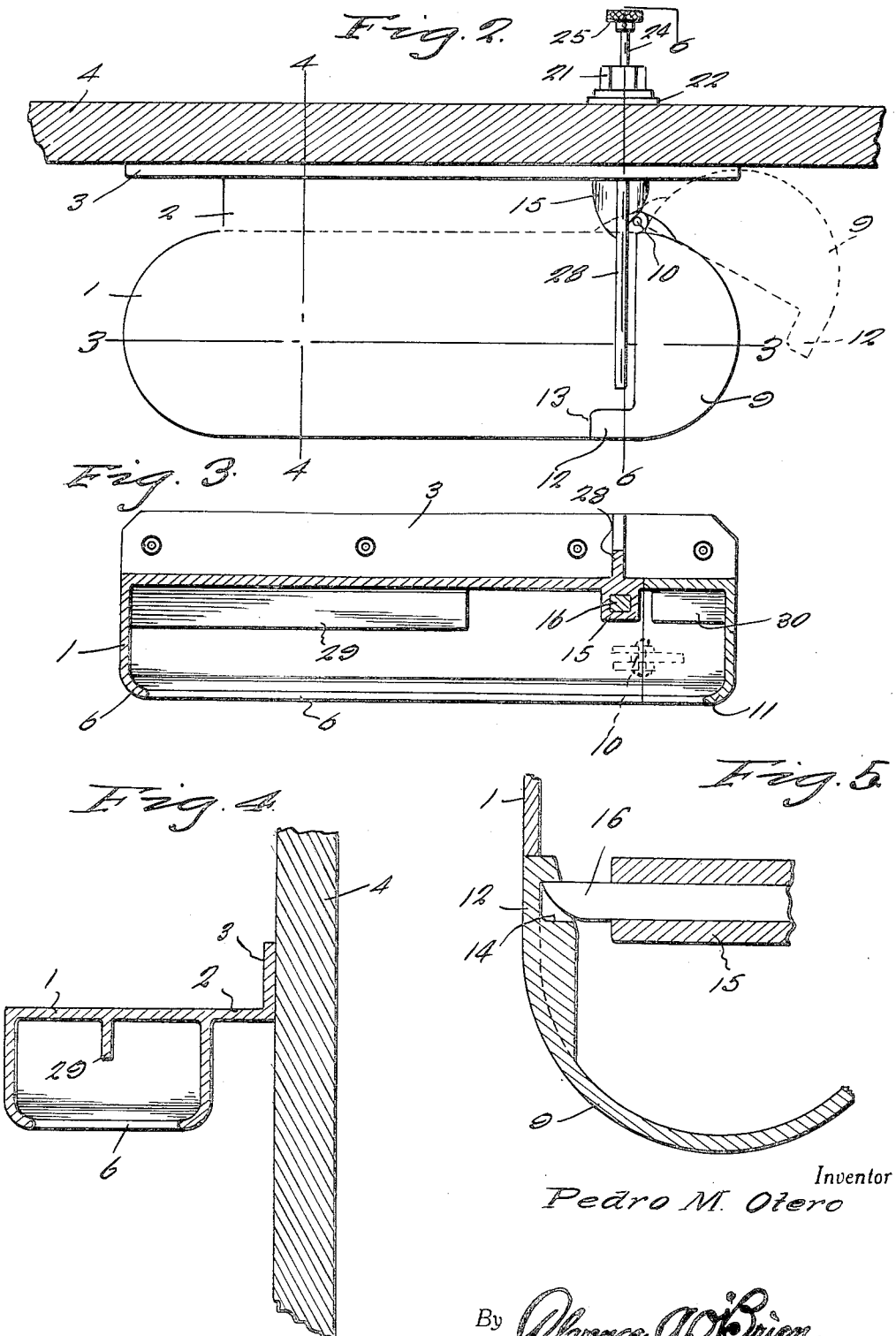

Patented May 8, 1934

1,957,610

UNITED STATES PATENT OFFICE 1,957,610

MILK BOTTLE LOCK

Pedro M. Otero, San Juan, P. R.

Application August 5, 1932, Serial No. 627,665
Renewed February 10, 1934

1 Claim. (Cl. 232—41)

The present invention relates to new and useful improvements in milk bottle locks and has for its primary object to provide, in a manner as hereinafter set forth, a device of this character embodying a novel construction, combination and arrangement of parts through medium of which the unauthorized removal of one or more bottles of milk left by a deliveryman will be effectively prevented.

Another important object of the invention is to provide a milk bottle lock of the aforementioned character embodying a novel construction whereby the top portion of the bottle or bottles will be entirely enclosed for promoting sanitation and preventing removal of the milk by opening the bottle or bottles and siphoning or otherwise withdrawing the milk therefrom.

Other objects of the invention are to provide a milk bottle lock of the character described which will be simple in construction, strong, durable, efficient and reliable in use, compact, attractive in appearance and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 2 is a view in top plan thereof.

Figure 3 is a view in vertical longitudinal section, taken substantially on the line 3—3 of Figure 2.

Figure 4 is a view in vertical transverse section, taken substantially on the line 4—4 of Figure 2.

Figure 5 is a detail view in horizontal section, taken substantially on the line 5—5 of Figure 1.

Figure 1:
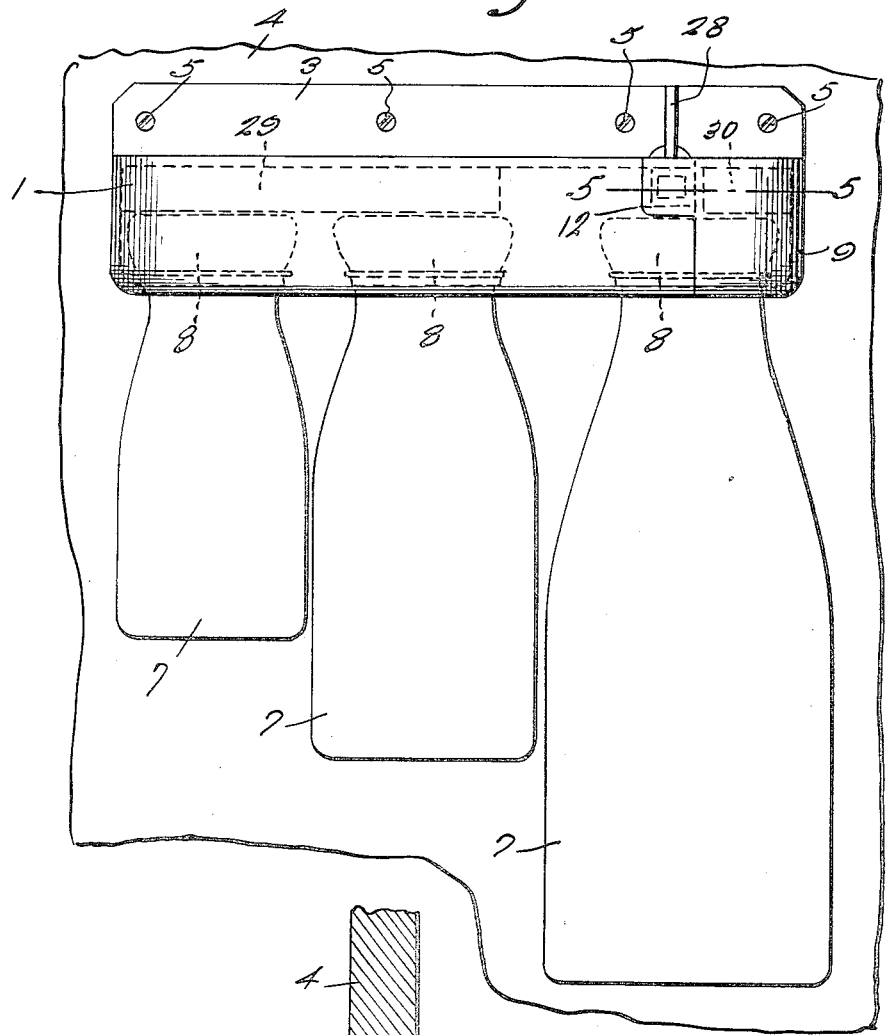
Figure 1 is a view in front elevation of a milk bottle lock constructed in accordance with the present invention.
Figure 6:
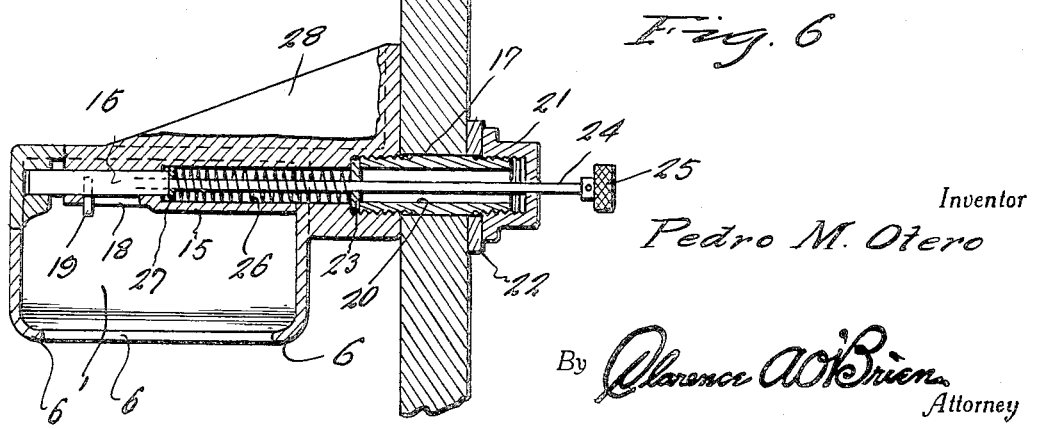
Figure 6 is a view in vertical transverse section, taken substantially on the line 6—6 of Figure 2.

Referring now to the drawings in detail, it will be seen that the embodiment of the present invention which has been illustrated comprises an elongated metallic casing 1 which is closed at its top, sides and one end, said casing being open at its other end and at its bottom. Formed integrally with the casing 1 is a laterally projecting web 2 which terminates in a right angularly extending apertured flange 3 providing means for mounting said casing in position on a door, wall or other suitable support, as at 4. Of course, screws or other securing elements are inserted through the apertures provided therefor in the flange 3, as at 5. The sides and end walls of the casing 1 terminate, at their lower portions in inturned bottle retaining flanges 6. The reference numeral 7 designates conventional milk bottles which are slidably inserted in the casing 1 through the open end of said casing, the enlarged mouth or top portions 8 of said bottles resting on the flanges 6.

A substantially segmental closure 9 is hingedly mounted, as at 10, on the open end of the casing 1 for swinging movement in a horizontal plane. The closure 9 is also open at its bottom and provided at this point with an inturned flange 11 constituting, when said closure is in closed position, a continuation of the flanges 6 on the casing 1. The upper portion of the free end of the closure 9 is provided with a thickened extension 12 which is engageable in a recess 13 which is provided therefor in the casing 1. On its inner side the extension 12 is provided with a bolt receiving socket 14.

Formed integrally with the top of the casing 1 closely adjacent the open end of said casing is a transversely extending housing 15 in which a bolt 16 is operable, said bolt being engageable in the socket 14 for releasably securing the closure 9 in closed position. The housing 15 extends to the outer face of the flange 3 and communicates with an opening 17 formed in the door or wall 4. The bore of the housing 15 in which the bolt 16 is mounted is polygonal to conform to the cross sectional shape of said bolt 16, thereby preventing rotation of the bolt. This portion of the housing 15 is provided with a slot 18 in which a pin 19 which depends from the bolt 16 is operable. The remaining portion of the bore of the housing 15 is circular and is provided with a counterbored, threaded outer end portion in which a threaded sleeve 20 is threadedly engaged. The sleeve 20 extends through the opening 17 and has threaded thereon a retaining cap 21. A gasket 22 is mounted on the sleeve or tube 20 between the retaining cap 21 and the door or wall 4. A disk 23 is mounted in the housing 15 between the sleeve or tube 20 and the shoulder provided by the threaded counterbore of said housing. An operating rod or stem 24 is anchored in the bolt 16 and passes slidably through openings provided therefor in the disk 23 and the cap 21, said rod or stem having a handle 25 on its free end. A coil spring 26 encircles the rod or stem 24 in the housing 15 between the disk 23 and the bolt 16, said coil spring being under tension and providing means for yieldingly urging the bolt toward operative position. A washer 27 is interposed between the bolt 16 and the coil spring 26 on the rod or stem 24.

The reference numeral 28 designates a strengthening or reinforcing web which extends transversely on top of the casing 1 upon the housing 15 to the flange 3. A longitudinal extending rib 29 depends from the top of the casing 1, said rib extending from the closed end of said casing to a point in spaced relation to the open end thereof. The casing 1 may be of any length to accommodate any desired number of bottles from 1 to, for example, 3. To accommodate single bottles, the casing 1 would be substantially of the same size as the closure 9 and the rib 29 would be omitted.

The closure 9 is normally secured in closed position even when the device is empty. To release the closure 9, the deliveryman may insert a finger or suitable tool upwardly for engagement with the pin 19 for retracting the bolt 16 and permitting the closure 9 to be swung to open position. The closure 9 is then swung to closed position, the bolt 16 snapping into the socket 14 for locking said closure. The rib 29 is sufficiently close to the tops of the bottles which are suspended wholly from the casing 1 to prevent said bottles from being swung, rocked or otherwise manipulated sufficiently to permit unauthorized persons from inserting a finger or tool for engagement with the pin 19 for unlocking the closure. It will thus be seen that the bottles are locked in suspended position against removal and in a manner to prevent tampering with the tops thereof. To remove the bottles, a person in the house or other building releases the closure 9 by retracting the bolt 16 against the tension of the coil spring 26 through the medium of the rod or stem 24, as will be apparent. Should it be desired to mount but one bottle in a device which is constructed to accommodate a plurality of bottles, a suitable filler is mounted in the casing 1 to prevent said one bottle from being slid too far into the casing from the open end thereof which would permit the closure 9 to be opened by unauthorized persons. The closure 9 is also provided with an integral rib 30 similar to the rib 29 which prevents the adjacent milk bottle from being rocked or swung sufficiently to permit access to be had to the pin 19 for retracting the bolt 16 by unauthorized persons.

It is believed that the many advantages of a milk bottle lock constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A bottle lock comprising an elongated casing for the reception of a plurality of bottles, said casing being open at its bottom and at one end, means for mounting the casing on a support, a hollow closure hingedly mounted on the open end of the casing and forming a continuation of the casing when said closure is in closed position, inturned flanges on the lower portions of the casing and the closure for supporting the bottles in suspended position, said casing having a recess at its open end, an extension on the free end of the closure engageable in the recess, said extension having a socket therein, a transverse housing integral with the casing and extending to the support, a bolt slidably mounted in the housing and engageable in the socket for releasably securing the closure in closed position, and means for actuating the bolt, the last named means including a sleeve threadedly engaged in the housing and extending through the support, a cap threadedly mounted on the sleeve, a rod fixed to the bolt and extending slidably through the cap, a handle fixed on the rod, and a coil spring mounted in the housing and engaged with the bolt for yieldingly urging said bolt toward operative position said housing having a slot therein in communication with the top part of the casing and a pin depending from the bolt and operable in the slot and providing means for manually retracting the bolt from the inside of the casing.

PEDRO M. OTERO.